UNITED STATES PATENT OFFICE.

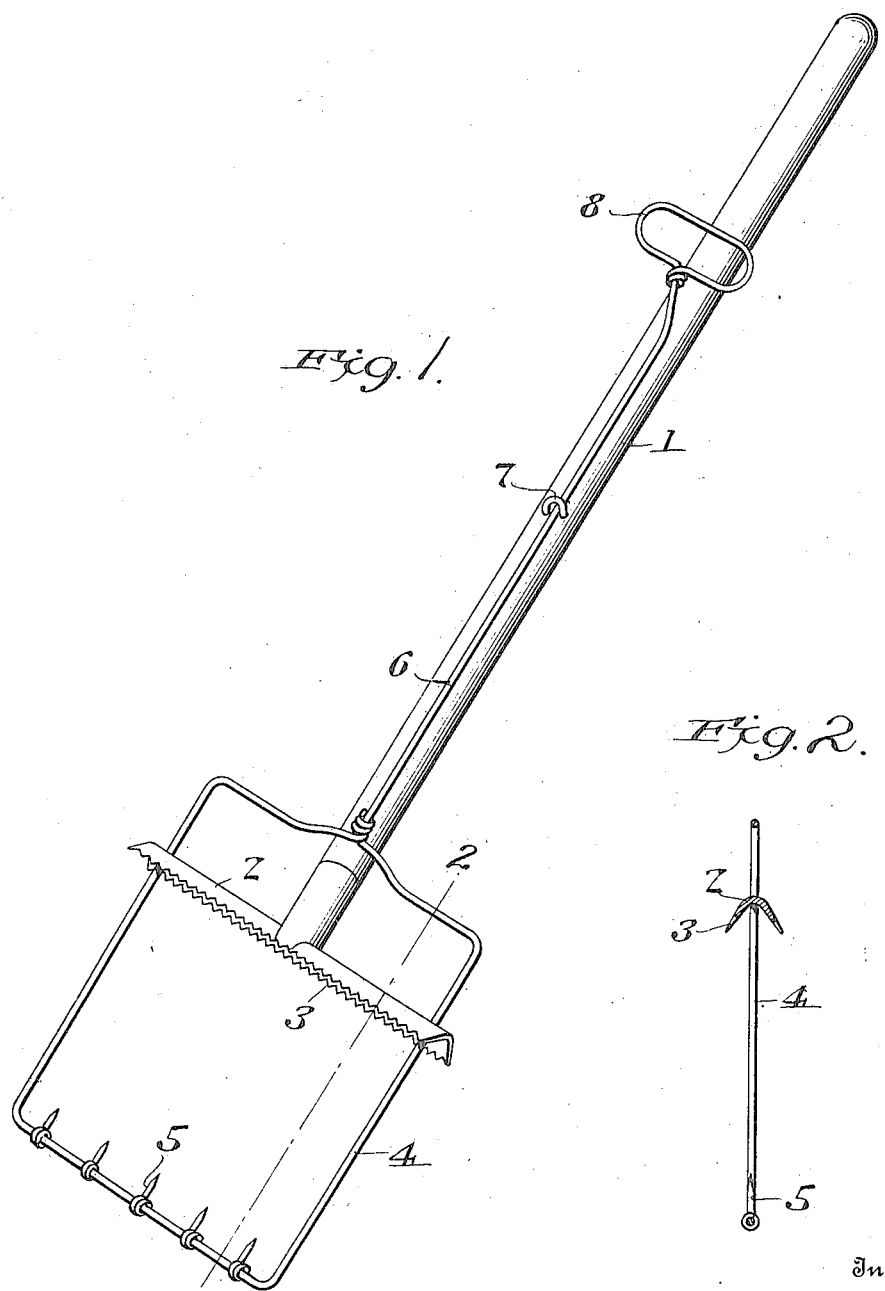

ISAAC B. KNAPP, OF COLD SPRING, NEW YORK.

FISH-CATCHER.

1,164,528.  Specification of Letters Patent.  Patented Dec. 14, 1915.

Application filed June 23, 1915. Serial No. 35,880.

*To all whom it may concern:*

Be it known that I, ISAAC B. KNAPP, a citizen of the United States, residing at Cold Spring, in the county of Putnam and State of New York, have invented new and useful Improvements in Fish-Catchers, of which the following is a specification.

This invention relates to implements especially adapted to be used for catching and handling fish, and it consists in the novel features hereinafter described and claimed.

An object of the invention is to provide a device of the character indicated of simple and durable structure, having means for engaging and securely holding a fish or the like at the time that it is being caught or when it is being handled.

With this object in view the device includes a staff having a head mounted thereon, the said head being provided with teeth or serrations. A loop is movably mounted through the head and is provided at its intermediate portion with a series of pins disposed toward the head. An operating rod or handle is connected or formed with the loop and extends along the staff and may be used for the purpose of drawing the pins toward the head for impaling the fish.

In the accompanying drawing:—Figure 1 is a perspective view of the device. Fig. 2 is a transverse sectional view of part of the same cut on the line 2—2 of Fig. 1.

The fish catching or handling device comprises a staff 1 having a head 2 mounted at one end thereof. The head 2 is preferably formed from sheet metal which is angular in transverse section and the head 2 is provided at its edges with teeth or serrations 3. A wire loop 4 passes through the end portions of the head 2 midway between the opposite edges thereof and pins 5 are mounted upon the intermediate portion of the loop 4 and their pointed ends are disposed toward the head 2. A rod 6 is provided upon or formed with the loop 4 and the said rod extends along the staff 1 and passes through an eye 7 mounted upon the said staff. The upper end of the rod 6 is formed as a handle 8, which lies transversely across the upper portion of the staff 1.

In operation the rod 6 is moved down along the staff 1 so that the pins 5 are carried away from the head 2. Thus, sufficient room is provided between the intermediate portion of the loop 4 and the head 2 to permit the fish to enter or the body of the fish may be passed through said space. Then the rod 6 is moved in an upward direction along the staff 1, whereby the fish is impaled upon the pins 5 and is brought in contact with the teeth or serrations 3 of the head 2, and is securely held. When it is desired to release the fish from the device, the rod 6 is moved in a downward direction, whereby the pins 5 are moved away from the head 2 and thus the fish may drop from between the intermediate portion of the loop 4 in the head 2.

From the above description taken in conjunction with the accompanying drawing it will be seen that a fish catching and handling device of simple and durable structure, is provided and that the said device may be easily and quickly manipulated for the purpose of grasping a fish or for releasing the same.

Having described the invention what is claimed is:—

A catcher comprising a staff, a head mounted thereon, said head being formed from metal and being angular in transverse section and having teeth at its opposite edges, a loop slidably mounted in the head in the vicinity of the ends thereof and between the sets of teeth, pins mounted upon the loop and disposed toward the head and lying in a plane between the sets of teeth upon the head and a handle connected with the loop.

In testimony whereof I affix my signature in presence of two witnesses.

ISAAC B. KNAPP.

Witnesses:
 DAVID S. HUESTIS,
 WILLIS M. SCOFIELD.